US011991232B2

(12) United States Patent
Ólafsson et al.

(10) Patent No.: US 11,991,232 B2
(45) Date of Patent: May 21, 2024

(54) COMMAND BUFFERING (71) Applicant: Spotify AB, Stockholm (SE)

(72) Inventors: Hilmar Birger Ólafsson, Stockholm (SE); Jérôme Ceccato, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/334,143

(22) Filed: May 28, 2021

(65) Prior Publication Data

US 2022/0385709 A1   Dec. 1, 2022

(51) Int. Cl.
*H04L 65/613* (2022.01)
*H04L 43/0852* (2022.01)
*H04L 49/90* (2022.01)

(52) U.S. Cl.
CPC ........ *H04L 65/613* (2022.05); *H04L 43/0852* (2013.01); *H04L 49/90* (2013.01)

(58) Field of Classification Search
None
See application file for complete search history.

(56) References Cited

U.S. PATENT DOCUMENTS

| | | | | | |
|---|---|---|---|---|---|
| 6,654,539 | B1 * | 11/2003 | Duruoz | ................ | H04N 9/8042 386/E5.052 |
| 6,842,437 | B1 * | 1/2005 | Heath | .................... | H04B 7/212 370/348 |
| 7,015,915 | B1 * | 3/2006 | Diard | .................. | G06F 15/8007 345/522 |
| 7,660,894 | B1 * | 2/2010 | Carrie | ..................... | H04L 67/60 709/225 |
| 7,730,133 | B2 * | 6/2010 | White | .................. | H04L 65/403 709/204 |
| 9,195,383 | B2 | 11/2015 | Garmark et al. | | |
| 9,554,093 | B2 * | 1/2017 | Hua | ..................... | H04N 21/812 |

(Continued)

FOREIGN PATENT DOCUMENTS

| CN | 105681750 B | 9/2018 | |
|---|---|---|---|
| EP | 3101871 A1 * | 12/2016 | ............. H04L 29/08 |

(Continued)

OTHER PUBLICATIONS

Spotify, Volume Buffering, describes a feature that became functional for 1% of Spotify users on Nov. 29, 2019 and for all users on Jan. 23, 2020, 4 pages.

(Continued)

*Primary Examiner* — Hitesh Patel
*Assistant Examiner* — Sandarva Khanal
(74) *Attorney, Agent, or Firm* — Merchant & Gould P.C.

(57) ABSTRACT

A method of processing playback content control commands generated at a client device and communicated by a backend server to the client device and a controlled device to control media content playback at the controlled device is provided. The method includes the following steps: sending, by the client device, a playback content control command to the backend server, wherein the backend server is configured to communicated the playback content control command to the client device and to the controlled device; initiating a buffer time period; and refraining from processing, at the client device, one or more subsequent playback content control commands from the backend server during the buffer time period.

17 Claims, 10 Drawing Sheets

(56) References Cited

U.S. PATENT DOCUMENTS

| | | | |
|---|---|---|---|
| 9,583,140 B1 | 2/2017 | Rady | |
| 10,735,825 B1* | 8/2020 | Comito | H04N 21/239 |
| 2008/0147879 A1* | 6/2008 | Buriano | H04L 47/10 |
| | | | 709/235 |
| 2009/0228630 A1* | 9/2009 | Wang | H04L 49/90 |
| | | | 711/E12.001 |
| 2010/0174810 A1* | 7/2010 | Cain | G06F 9/4416 |
| | | | 709/222 |
| 2011/0205895 A1* | 8/2011 | Chen | H04L 47/283 |
| | | | 370/231 |
| 2012/0219067 A1* | 8/2012 | Jefremov | H04N 19/174 |
| | | | 375/E7.026 |
| 2014/0079170 A1* | 3/2014 | Le Houerou | H04L 47/263 |
| | | | 375/371 |
| 2014/0108497 A1 | 4/2014 | Yao et al. | |
| 2014/0215540 A1 | 7/2014 | Podolsky | |
| 2014/0359681 A1* | 12/2014 | Amidei | H04N 21/43 |
| | | | 725/93 |
| 2016/0157133 A1* | 6/2016 | Ehsan | H04L 5/001 |
| | | | 370/252 |
| 2016/0260123 A1* | 9/2016 | Mishra | G06Q 30/0244 |
| 2016/0277458 A1 | 9/2016 | Zarom | |
| 2016/0295539 A1* | 10/2016 | Atti | H04M 3/562 |
| 2017/0093943 A1* | 3/2017 | Alsina | G06F 16/685 |
| 2017/0286051 A1* | 10/2017 | Mendes | H04N 21/8106 |
| 2017/0289583 A1* | 10/2017 | Liu | H04L 65/605 |
| 2018/0158453 A1* | 6/2018 | Campbell | G10L 15/22 |
| 2018/0295050 A1* | 10/2018 | Lee | H04L 43/087 |
| 2019/0124159 A1* | 4/2019 | Alsina | H04N 21/2543 |
| 2019/0158353 A1 | 5/2019 | Johnson et al. | |
| 2019/0304507 A1 | 10/2019 | Layfman et al. | |
| 2019/0340722 A1* | 11/2019 | Aas | G06F 9/52 |
| 2020/0135138 A1* | 4/2020 | Wang | H04N 21/47202 |
| 2021/0064369 A1* | 3/2021 | Dunlop | G06F 9/4881 |
| 2021/0110862 A1* | 4/2021 | Mehta | G11C 15/04 |
| 2023/0388578 A1* | 11/2023 | Brockmann | H04N 21/2393 |

FOREIGN PATENT DOCUMENTS

| | | | | |
|---|---|---|---|---|
| WO | WO-0120874 A1 * | 3/2001 | | H04L 1/1809 |
| WO | WO-03043272 A1 * | 5/2003 | | H04L 12/5693 |
| WO | WO-2013162159 A1 * | 10/2013 | | G06F 3/0236 |
| WO | WO-2014062156 A1 * | 4/2014 | | H04W 76/18 |

OTHER PUBLICATIONS

European Extended Search Report in Application 22169392.2, dated Oct. 4, 2022, 8 pages.

* cited by examiner

COMMAND BUFFERING

BACKGROUND

Media streaming platforms are platforms that provide streaming media. The streaming media are multimedia that are constantly received by and presented to an end user while being delivered by the media streaming platforms. Streaming refers to the process of delivering or obtaining media in a continuous manner from a particular source. A user can play media content on a client device such as a mobile phone.

Alternatively, a user can also play media content on a playback device called a "controlled device" and control the playback with the client device. This configuration is referred to as a remote control configuration. The controlled device may be, for example, a smart speaker, a smart TV, and the like. It is desirable to provide users with good user experience and a manageable backend load in the remote control configuration.

SUMMARY

In general terms, this disclosure is related to systems and methods for playback state control command management. Specifically, the playback state control command management includes, among other things, a throttling process of playback state control commands, a buffering process of playback state control commands, and a dynamic buffer time period adjustment process, details of which are described below in the Detailed Description.

One aspect can include a method of processing playback content control commands generated at a client device and communicated by a backend server to the client device and a controlled device to control media content playback at the controlled device. The method includes the following steps: sending, by the client device, a playback content control command to the backend server, wherein the backend server is configured to communicated the playback content control command to the client device and to the controlled device; initiating a buffer time period; and refraining from processing, at the client device, one or more subsequent playback content control commands from the backend server during the buffer time period.

In another aspect, a non-transitory computer-readable medium is provided. The non-transitory computer-readable medium stores instructions that, when executed by a processor, cause the processor to: send, by a client device, a playback content control command to a backend server, wherein the backend server is configured to communicate the playback content control command to the client device and to a controlled device; initiating a buffer time period; and refrain from processing, at the client device, one or more subsequent playback content control commands from the backend server during the buffer time period.

Another aspect further comprises that the instructions further cause the client device to: send a prior playback content control command to the backend server; determine whether the playback content control command is within the buffer time period starting from the sending of the prior playback content control command; when the playback content control command is within the buffer time period, store the playback content control command; after the buffer time period has elapsed, determine whether the playback content control command is a latest playback content control command stored; and when the playback content control command is the latest playback content control command stored, send the playback content control command to the backend server.

In yet another aspect, a system for processing playback content control commands is provided. The system includes a backend server and a client device. The client device includes a command buffer having a buffer time period. The client device is configured to: generate a playback content control command; send the playback content control command to the backend server; trigger the command buffer to be active for the buffer time period; and refrain from processing one or more subsequent playback content control commands from the backend server during the buffer time period.

Another aspect further comprises that the data instructions further cause the client device to: determine whether the playback content control command is within the buffer time period starting from when a prior playback content control command was sent; when the playback content control command is within the buffer time period, store the playback content control command in a pending command register; after the buffer time period has elapsed, determine whether the playback content control command is a latest playback content control command stored in the pending command register; and when the playback content control command is the latest playback content control command stored in the pending command register, send the playback content control command to the backend server when the buffer time period ends.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
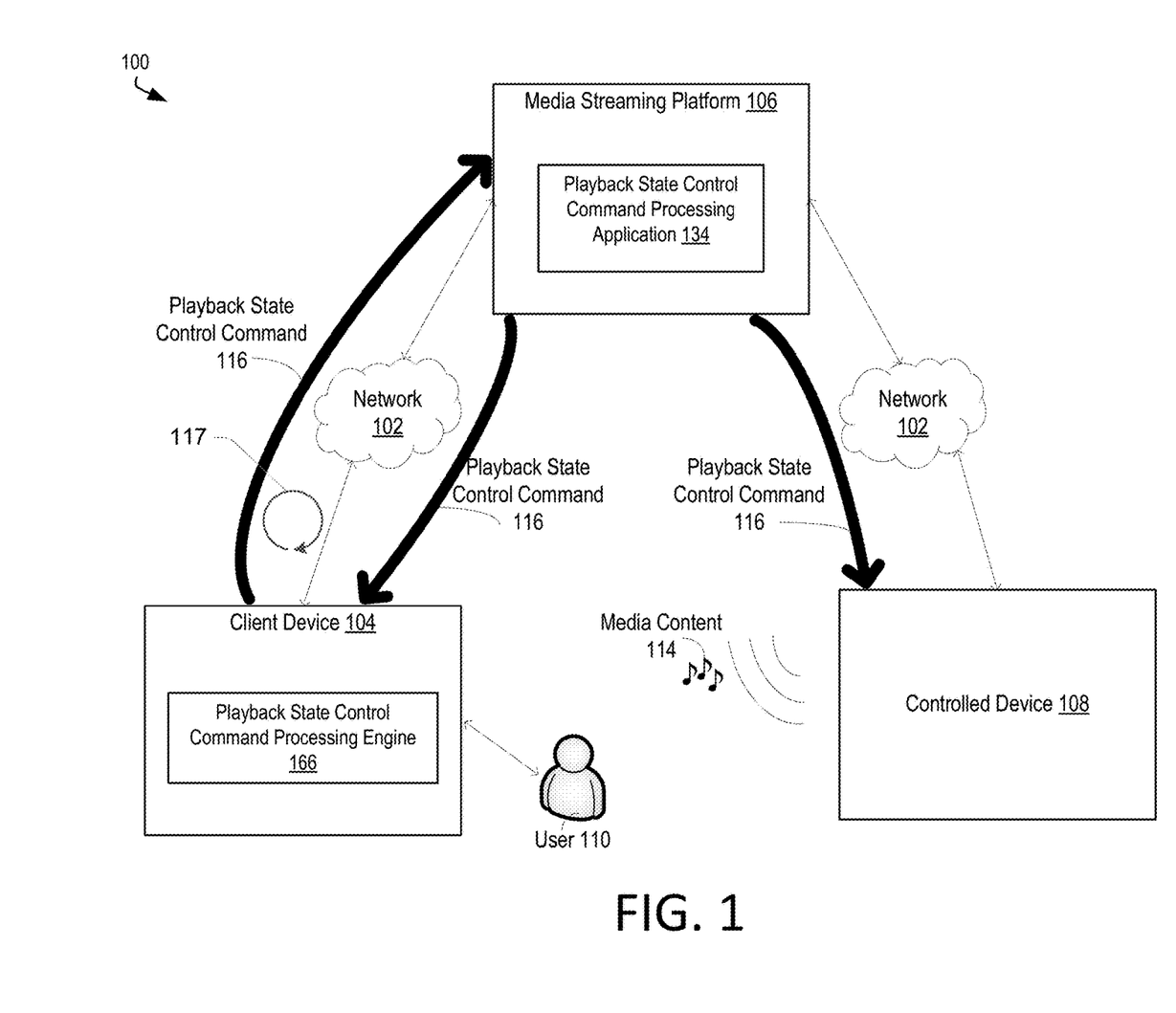
FIG. 1 illustrates an example system for playback state control command management.

FIG. 1 illustrates an example system 100 for playback state control command management. As mentioned above, a user 110 of a media streaming platform (also generally referred to as a "backend server") 106 can play media content 114 in a remote control configuration, where the user 110 can play the media content 114 on a controlled device 108 while using the client device 104 as a remote. In order to do so, the user 110 need to have the client device 104 (e.g., a mobile phone, a tablet, a laptop, etc.) with some software (e.g., an application), provided by the media streaming platform 106, installed on the client device 104. Both the client device 104 and the controlled device 108 are connected to the media streaming platform via a network 102 (e.g., a Wi-Fi® network), and the controlled device 108 is added in the software installed on the client device 104. Using the remote control configuration, the user 110 can enjoy high-quality sound, make and receive calls without stopping the playback of media content, save battery of the client device, switching smoothly among the client device 104 and one or more controlled devices 108 that are supported by the remote control configuration.

The user 110 interacts with the client device 104, for example, by swiping on a touch screen of the client device 104. As a result, the client device 104 can generate playback state control commands 116 accordingly. Playback state control commands are commands 116 that control the playback of the media content 114, provided by the media streaming platform, on the controlled device. Playback state control commands may be divided into two categories: playback content control commands and playback manner control commands. Playback content control commands are playback state control commands that control "what" media content is currently being played. Playback content control commands 116 may include play/pause commands, skip forward commands, skip backward commands, scrubbing commands to change a playback position on a playback position bar, and the like. On the other hand, playback manner control commands are playback state control commands that control "how" the media content is being played. Playback manner control commands may include volume change commands.

After the client device 104 sends the playback state control commands 116 to the media streaming platform 106, the media streaming platform 106 sends the control commands 116 to the controlled device 108. As such, the playback of the media content 114 on the controlled device 108 is being controlled by the user 110 using the client device 104. In the meantime, the media streaming platform 106 also sends the playback control commands 116 to the client device 104 to update and display the playback state on the client device 104. Therefore, there is a loop 117 of the playback state control commands 116 between the client device 104 and the media streaming platform 106. There are problems with the current technology that are associated with the loop 117.

Figure 2:
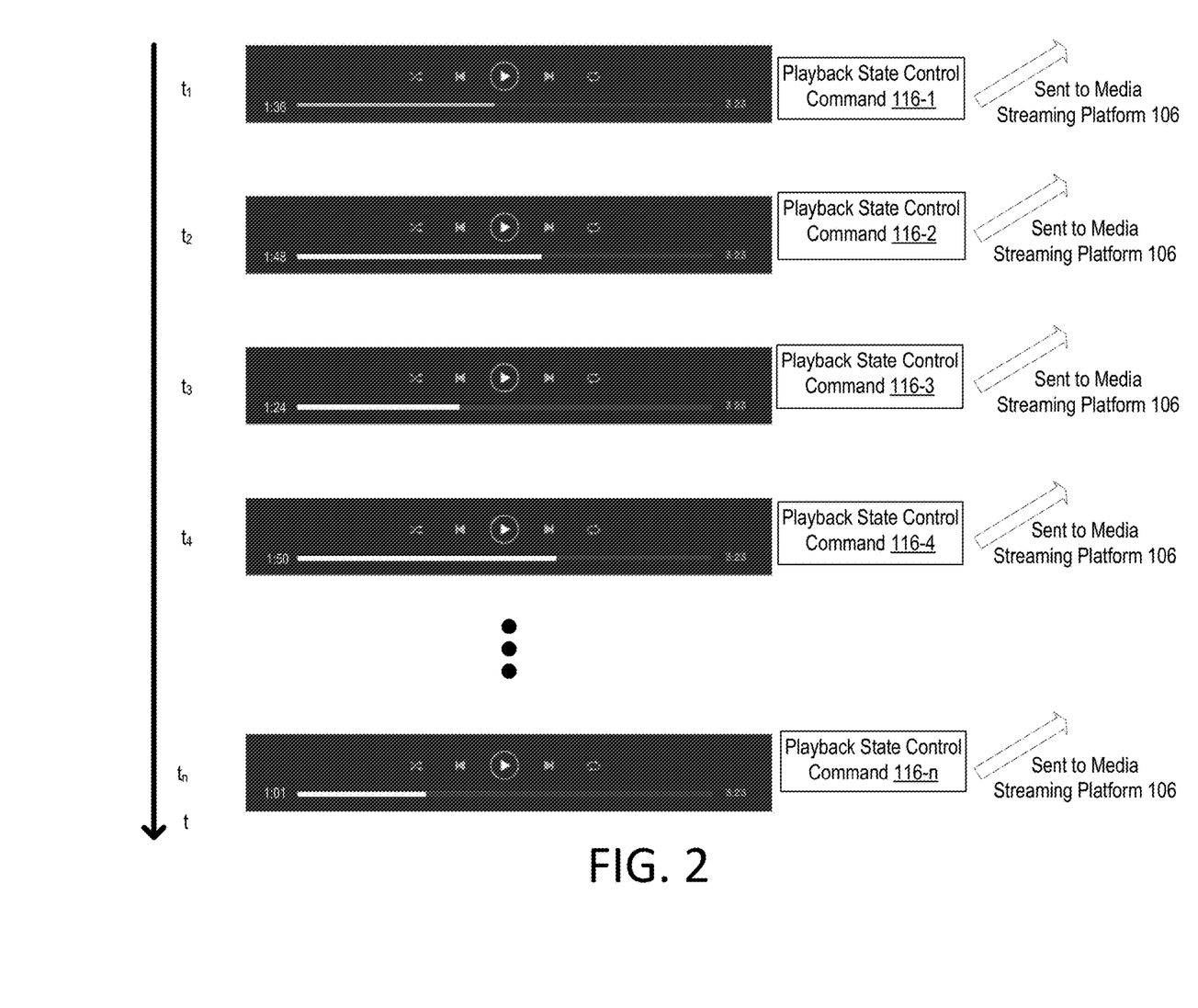
FIG. 2 is a diagram illustrating an example in which multiple playback state control commands are sent to the media streaming platform, such as in response to user input.

FIG. 2 is a diagram illustrating an example in which multiple playback state control commands are sent to the media streaming platform 106. In the example of FIG. 2, the user 110 is interacting with a user interface of the client device 104 frequently in a short period of time. More specifically, in this example, the user is scrubbing, i.e., selecting a playback position and moving it back and forth, on a playback position bar in an effort to control the current playback position, to adjust the playback of the track. At the moment $t_1$, the client device 104 sends a playback state control command 116-1, which corresponds to a position of 1 minute and 36 seconds, to the media streaming platform 106. At the moment $t_2$, the client device 104 sends another playback state control command 116-2, which corresponds to a position of 1 minute and 48 seconds, to the media streaming platform 106. However, when the client device 104 receives the playback state control command 116-1 sent back by the media streaming platform 106 as an update at the moment $t_2$ (i.e., later than $t_1$ due to network latency), the update is inconsistent with the most recent playback state control command sent from the client device 104, i.e., the playback state control command 116-2 at the moment $t_2$ in this example. This can lead to a "fight", also known as a "race condition," between the user 110 and the media streaming platform 106 at the client device 104, where both of them are trying to change the playback state simultaneously, which can result in confusion and frustration by the user 110. Due to the "fight" between the user 110 and the media streaming platform 106, it is more likely for the user 110 to over-adjust or under-adjust the playback state, i.e., the playback position in the playback position bar in this example. As a result, the user 110 may keep scrubbing the playback position back and forth, sending a series of playback state control commands 116-3, 116-4, . . . , 116-$n$ to the media streaming platform 106. This could lead to further confusion and frustration by the user 110. The user experience is significantly compromised.

Another problem occurs when the user 110 provides rapid playback control inputs at the client device 104, which causes the client device 104 to send numerous playback state control commands 116 to the media streaming platform 106 during a short time period. This could happen in the situation explained above with reference to FIG. 2. This could also happen if the user 110 presses a playback control button (e.g., skip forward) rapidly. When a user selects and slides the playback position backward or forward, the client device 104 rapidly sends multiple playback state control commands as it moves. This continues until the user 110 stops moving and releases the playback position, and results in many playback state control commands being sent in a short period of time. One obvious problem with this is that it generates a lot of (unnecessary) communication that both the client device 104 and the media streaming platform 106 must process.

To address one or more of the problems described above, in some embodiments, the client device 104 may include a playback state control command processing engine 166, whereas the media streaming platform 106 may include a playback state control command processing application 134. The playback state control command processing engine 166 and the playback state control command processing application 134 will be described in detail below with reference to FIGS. 3-8.

Figure 3:
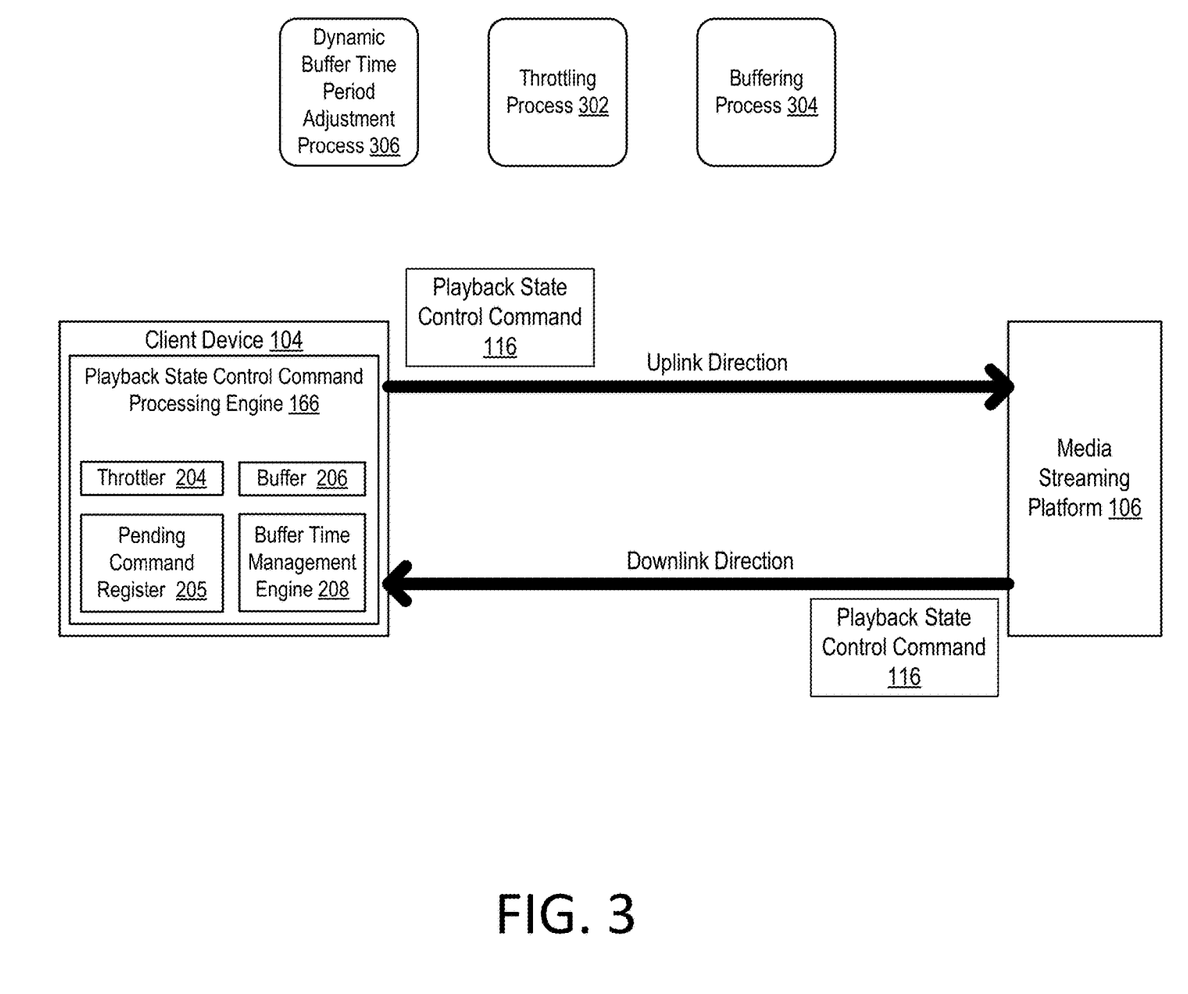
FIG. 3 illustrates an example of the playback state control command management.
Figure 4:
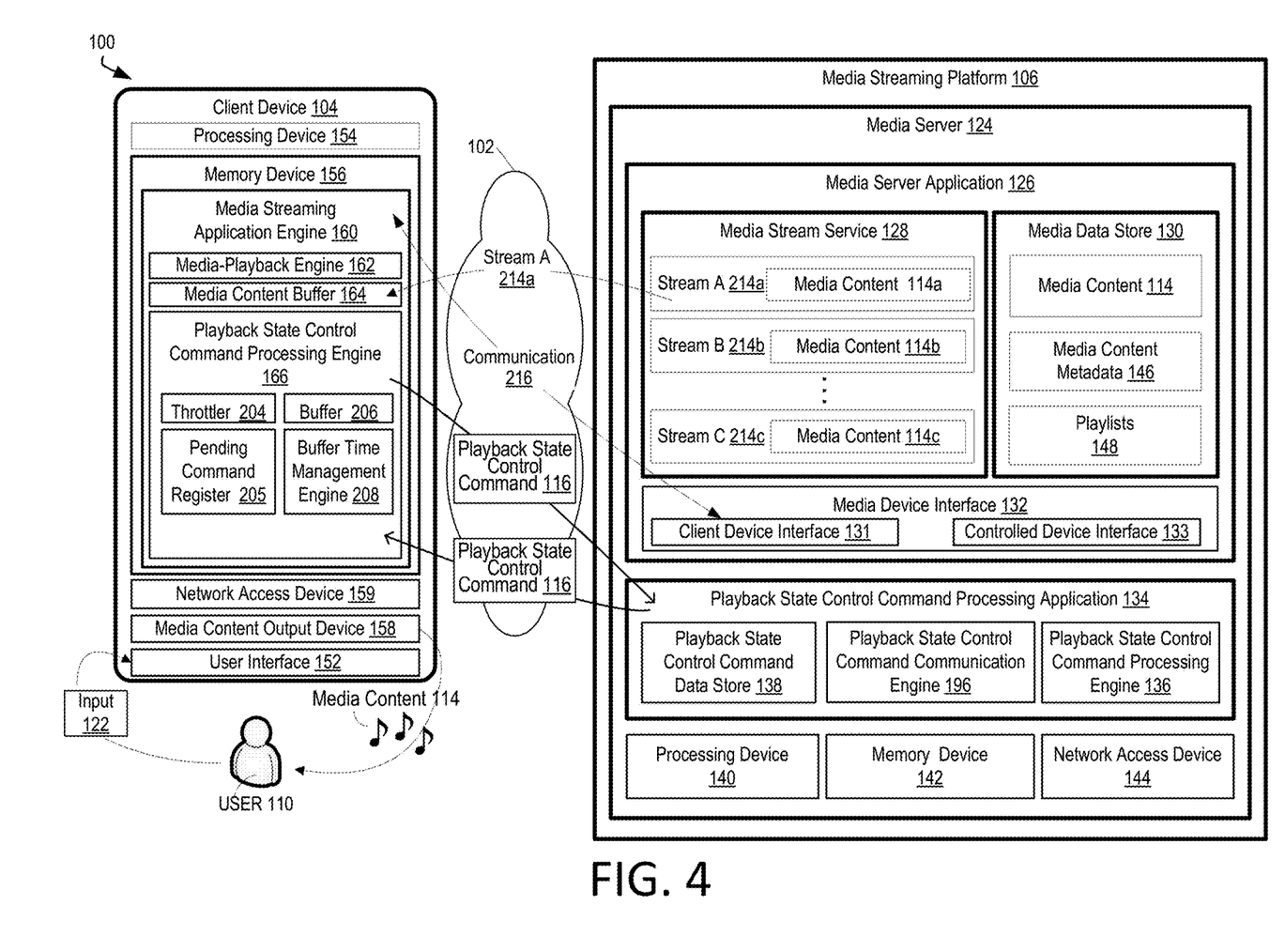
FIG. 4 is a block diagram illustrating an example of the interaction between the client device of FIG. 3 and the media streaming platform of FIG. 3.

FIG. 3 illustrates an example of the playback state control command management. FIG. 4 is a block diagram illustrating a further example of the interaction between the client device 104 of FIG. 3 and the media streaming platform 106 of FIG. 3. As shown in FIG. 3, the client device 104 sends playback state control commands 116 to the media streaming platform 106 in the uplink direction, i.e., from the client device 104 to the media streaming platform 106. The media streaming platform 106 subsequently sends the playback state control command 116 back to the client device 104 in the downlink direction, i.e., from the media streaming platform 106 to the client device 104. The playback state control command processing engine 166 may include, among other things, a (command) throttler 204, a pending command register 205, a (command) buffer 206, and a buffer time management engine 208. The throttler 204 and the pending command register 205 are used to implement a throttling process 302, which will be described in detail below with reference to FIG. 5 and FIG. 8. As explained below, the throttling process 302 involves the uplink direction. The buffer 206 is used to implement a buffering process 304, which will be described in detail below with reference to FIG. 5 and FIG. 6. It should be noted that in other embodiments, the buffer 206 may operate as a separate module outside the client device 104. As explained below, the buffering process 304 involves both the uplink direction and the downlink direction. The buffer time management engine 208 is used to implement the dynamic buffer time period adjustment process 306, which will be described in detail below with reference to FIG. 7.

At a high level, the throttling process 302 addresses the problem discussed above that occurs when there are multiple playback state control commands 116 sent from the user 110 in a short time period. When activated, the throttler 204 makes sure that at most one playback state control command 116 is sent to the media streaming platform 106 during each buffer time period. In some embodiments, the buffer time period is a predetermined time period. In other embodiments, the buffer time period is a dynamic time period, which will be described in detail below. Thus, even if the user 110 provides rapid inputs and the client device generates many playback state control commands 116, the first one will be sent and the throttler 204 is activated. The throttler 204 then prevents any subsequent playback state control commands 116 from being sent until the buffer time period (e.g., 200 ms or a dynamic buffer time period as discussed below) has elapsed. At the end of the buffer time period, the latest (after the first command) playback state control command 116 that was received from the client device 104 can then be sent, and any other playback state control commands 116 are discarded/ignored. This greatly reduces the load on the media streaming platform 106 by limiting (throttling) the number of playback state control commands 116 that can be sent in a short time period.

At a high level, the buffering process 304 addresses the feedback loop 117 between the user 110 and the media streaming platform 106. While the user 110 is providing inputs into the client device 104 (causing the client device 104 to send multiple playback state control commands 116 to the media streaming platform 106 in the uplink direction), the client device 104 turns on the buffer 206, which is active for the buffer time period. Similarly, in some embodiments, the buffer time period is a predetermined time period. In other embodiments, the buffer time period is a dynamic time period, which will be described in detail below. As a result, the buffer 206 causes the client device 104 to refrain from processing (i.e., ignoring) any playback state control commands 116 that it receives back from the media streaming platform 106 in the downlink direction during that buffer time period.

It does this by activating a buffer for a buffer time period (e.g., 200 milliseconds) after sending a playback state control command to the media streaming platform 106, and ignoring any messages the client device receives from the server during this period. Moreover, the client device 104 may directly synchronize with the media streaming platform 106, after a time period (e.g., 2 seconds later) longer than the buffer time period without a new playback state control command 116, to make sure that there is no difference in terms of the playback state between the client device 104 and the media streaming platform 106.

At a high level, the dynamic buffer time period adjustment process 306 addresses a challenge caused by changing network latency. In other words, the current network latency may not be as good as the previous network latency. A dynamic buffer time period can make sure the throttling process 302 and the buffering process 304 are able to function well in a constantly changing network environment. In one embodiment, the dynamic buffer time is calculated dynamically based on an evaluation of the current network characteristics (e.g., network latency, network speed, and network reliability).

Referring to FIG. 4, the client device 104 communicates with the media streaming platform 106 over the network 102. The network 102 is an electronic communication network that facilitates communication between two or more components of the system 100. In some embodiments, the network 102 is a local area network, peer-to-peer connection, wireless or cellular network, or other forms of network.

The client device 104 can receive and play media content 114 delivered by the media streaming platform 106. In some embodiments, the client device 104 can be, for example, personal computer systems, handheld entertainment devices, tablet devices, smartphones, or other types of devices that are adapted or able to install software and control the playback of the media content on the controlled device 108.

In the example of FIG. 4, the client device 104 includes, among other things, a processing device 154, a memory device 156, a network access device 159, a media content output device 158, and a user interface 152.

In an example, the processing device 154 includes one or more central processing units (CPU). In other embodiments, the processing device 154 additionally or alternatively includes one or more digital signal processors, field-programmable gate arrays, or other electronic circuits.

The memory device 156 operates to store data and instructions. In the example of FIG. 4, the memory device 156 includes both a media streaming application engine 160 for the playback of the media content 114 on the client device 104 itself and the playback state control command processing engine 166 of FIG. 3 for controlling the playback of the media content 114 on the controlled device 108.

The network access device 159 operates to communicate with other components of the system 100 over the networks, such as the network 102. Examples of the network access device 159 include one or more wired network interfaces and wireless network interfaces. Examples of such wireless network interfaces of the network access device 159 include wireless wide area network (WWAN) interfaces (including cellular networks) and wireless local area network (WLANs) interfaces. In other examples, other types of wireless interfaces can be used for the network access device 159.

The media content output device 158 operates to output media content 114. In some embodiments, the media content output device 158 generates media content output for the user 110. Examples of the media content output device 158 include a speaker assembly comprising one or more speakers, an audio output jack, a Bluetooth® transmitter, a display panel, and a video output jack. Other embodiments are possible as well. For example, the media content output device 158 may transmit a signal through the audio output jack or Bluetooth® transmitter that can be used to reproduce an audio signal by a connected or paired device such as headphones or a speaker system.

The user interface 152 is the one or more components of the client device 104 over which the user 110 and the client device 104 can interact unidirectionally or bidirectionally.

The user interface 152 can include, for example, a touch screen that can display data to the user 110 and receive input 122 from a selector (e.g., a finger, stylus, etc.) controlled by the user 110. The user interface 152 can include, for example, a display device, a mouse, a keyboard, a webcam, a microphone, speakers, a headphone, haptic feedback devices, or other components.

The media streaming application engine 160 is software installed in the memory device 156 for using the media streaming services provided by the media streaming platform 106. The media streaming application engine 160 includes, among other things, a media-playback engine 162 and a media content buffer 164.

The media-playback engine 162 selects and plays back media content 114, generates interfaces for controlling and playing media content 114. The media content buffer 164 operates to serve as a client-side buffer that can be used to control the playback of the media content 114 received from the media streaming platform 106.

As described above, the playback state control command processing engine 166 includes, among other things, a throttler 204, a pending command register 205, a buffer 206, and a buffer time management engine 208. The throttler 204 and the pending command register 205 are used to implement a throttling process 302, which will be described in detail below with reference to FIG. 5 and FIG. 8. The buffer 206 is used to implement a buffering process 304, which will be described in detail below with reference to FIG. 5 and FIG. 6. The buffer time management engine 208 is used to implement the dynamic buffer time period adjustment process 306, which will be described in detail below with reference to FIG. 7.

On the other hand, the media streaming platform 106 includes a media server 124. The media server 124 includes, among other things, a processing device 140, a memory device 142, a network access device 144, the playback state control command processing application 134, and a media server application 126. The processing device 140, the memory device 142, and the network access device 144 may provide similar functionality as the processing device 154, the memory device 184, and the network access device 159 and, therefore, are not repeated for simplicity.

The playback state control command processing application 134 serves as an interface with the playback state control command processing engine 166. The playback state control command processing application 134 further includes, among other things, a playback state control command processing engine 136, a playback state control command data store 138, and a playback state control command communication engine 196. The playback state control command processing engine 136 processes the playback state control commands 116 received from the client device 104. The playback state control command data store 138 may temporarily store the playback state control commands 116 received from the client device 104. The playback state control command communication engine 196 communicates the playback state control command 116 to the client device 104 and the controlled device 108.

The media server application 126 includes a media device interface 132, a media data store 130, and a media stream service 128. The media device interface 132 further includes a client device interface 131 and a controlled device interface 133. The client device interface 131 operates to serve as an interface over which the media streaming platform 106 can communicate with the media streaming application engine 160 at the client device 104. In the example of FIG. 4, the client device interface 131 may communicate with the media streaming application engine 160 to facilitate the communication 216. The controlled device interface 133 operates to serve as an interface over which the media streaming platform 106 can communicate with the controlled device 108.

In the example of FIG. 4, the media data store 130 may store media content 114, media content metadata 146, and playlists 148, though other categories of data may also be stored thereon. The media data store 130 may comprise one or more databases and file systems.

The media content metadata 146 operates to provide various information associated with the media content 114. In some embodiments, the media content metadata 146 includes one or more of title, artist name, album name, length, genre, mood, era, and other information. The playlists 148 operate to identify one or more of the media content 114. In some embodiments, the playlists 148 identify a group of the media content 114 in a particular order. In other embodiments, the playlists 148 merely identify a group of the media content 114 without specifying a particular order. Some, but not necessarily all, of the media content 114 included in a particular one of the playlists 148 are associated with a common characteristic such as a common genre, mood, or era. The playlists 148 may include user-created playlists, which may be available to a particular user, a group of users, or to the public.

The media stream service 128 operates to buffer media content such as media content 114a, 114b, and 114c, for streaming to one or more streams 214a, 214b, and 214c. In the example of FIG. 4, the media content 114a is currently being streamed to the client device 104 through one stream 214a (i.e., "Stream A").

Figure 5:
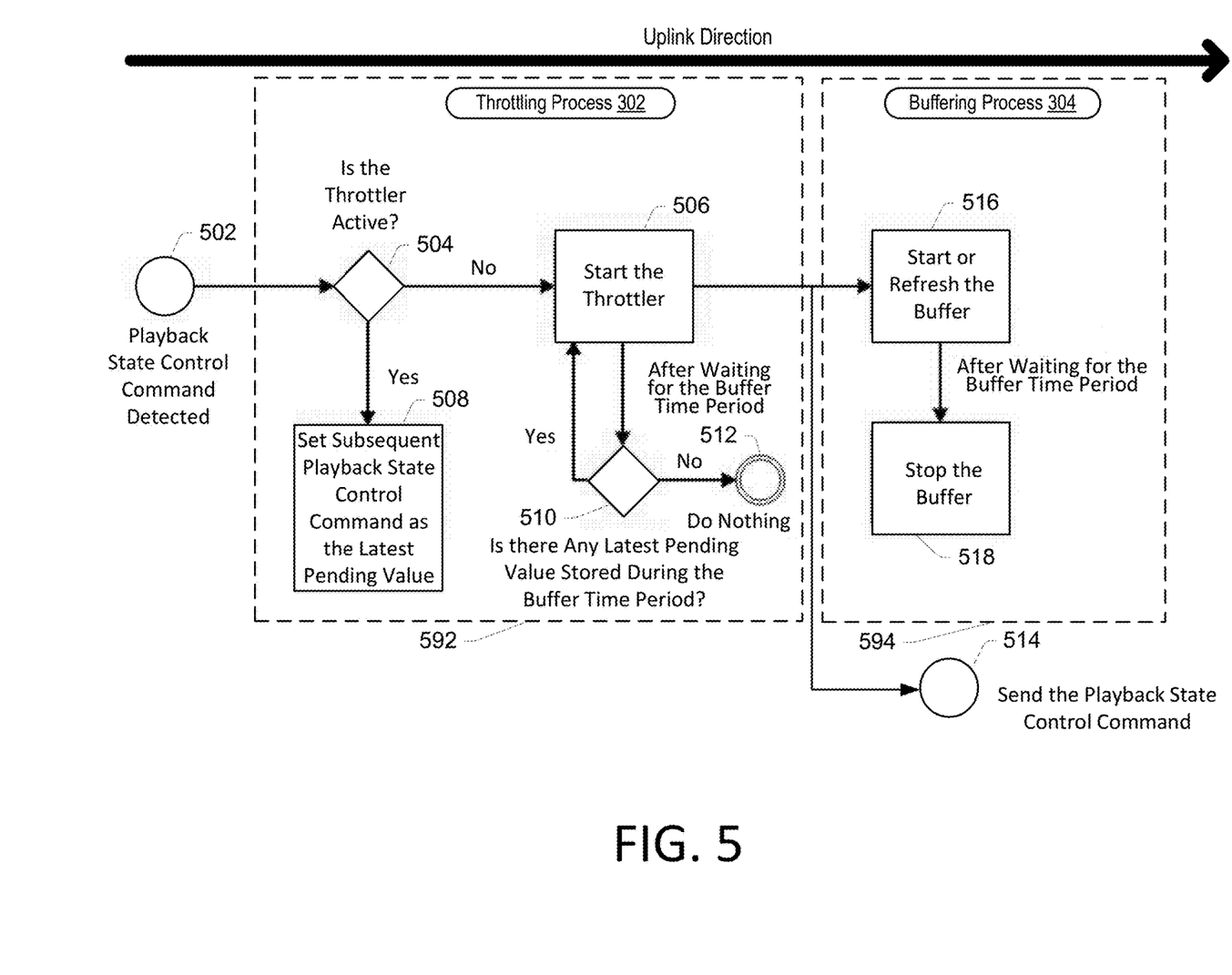
FIG. 5 is a flow chart illustrating an example of the throttling process and the buffering process of FIG. 3 in the context of the uplink direction.
Figure 6:
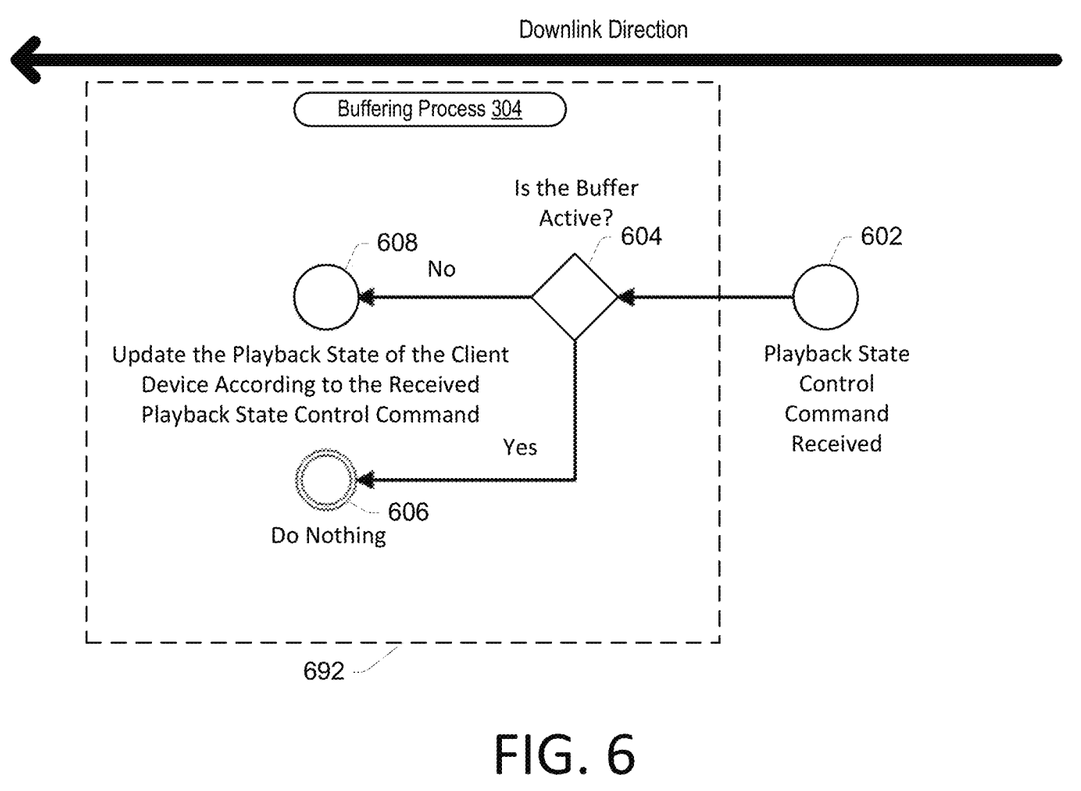
FIG. 6 is a flow chart illustrating an example of the buffering process of FIG. 3 in the context of the downlink direction.
Figure 8:
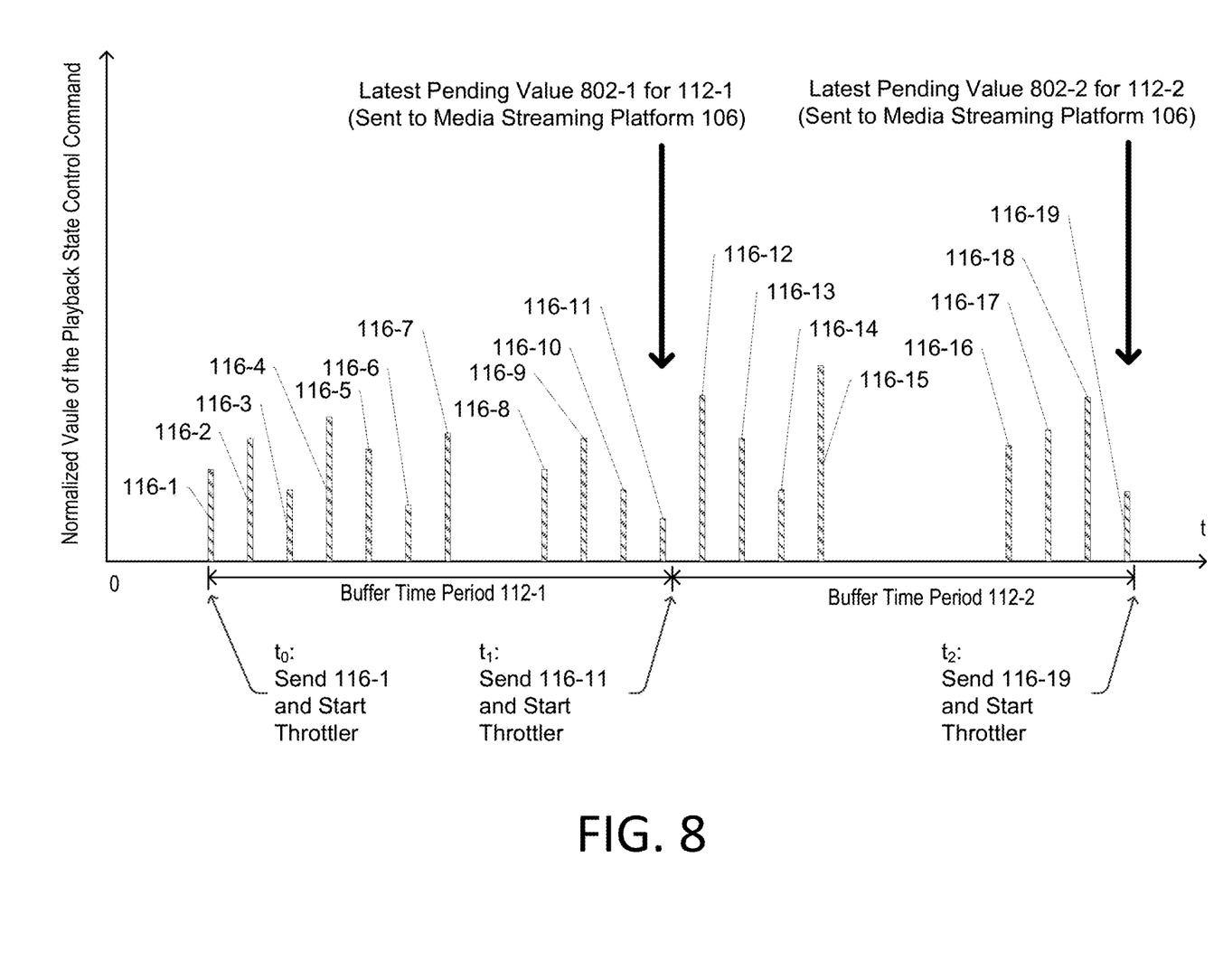
FIG. 8 is a timeline illustrating a series of example playback state control commands generated and sent by the client device.

FIG. 5 is a flow chart illustrating another example of the throttling process 302 and the buffering process 304 of FIG. 3 in the context of the uplink direction. FIG. 6 is a flow chart illustrating another example of the buffering process 304 of FIG. 3 in the context of the downlink direction. FIG. 8 is a timeline illustrating a series of example playback state control commands 116-1 to 116-19 (collectively, 116) generated and sent by the client device 104.

The process in FIG. 5 begins with operation 502, where a playback state control command 116 is detected. In the example of FIG. 5, the process then goes through the throttling process 302 in the block 592. The throttling process 302 begins with operation 504, where it is determined whether the throttler 204 is active. When the throttler 204 is not active (e.g., the playback state control command 116 is the first one after a long period of time, e.g., the playback state control command 116-1 in FIG. 8), the throttling process 302 proceeds to operation 506, where the throttler 204 is started. In the meantime, the throttling process 302 proceeds to both the buffering process 304 in the block 594 and operation 514. It should be noted that the throttling process 302 is optional in some embodiments. At operation 514, the playback state control command is sent to the media streaming platform 106. In the example of FIG. 8, the playback state control command 116-1 is sent at the moment to when the throttler 204 is started.

On the other hand, once the operation 506 has started the throttler 204 and it is still within the buffer time period (e.g., the buffer time period 112-1 of FIG. 8) of the throttler 204, any subsequent playback state control commands 116 (e.g., playback state control commands 116-2, 116-3, . . . , 116-11) generated within the buffer time period 112-1 will go through operation 508 instead of operation 506. At operation 508, every time a subsequent playback state control command (e.g., the playback state control command 116-3 of FIG. 8) is generated, it is set as the latest pending value (e.g., the latest pending value 802-1 for the buffer time period 112-1 of FIG. 8) in the pending command register 205 of FIG. 3, overwriting the previous pending value (e.g., the previous pending value corresponding to the playback state control command 116-2 of FIG. 8). The throttling process 302 continues until after waiting for the buffer time period (e.g., the buffer time period 112-1 of FIG. 12). At the end of the buffer time period, the latest pending value for the buffer time period (e.g., the pending value corresponding to the playback state control command 116-11) is stored in the pending command register 205.

At operation 510, it is determined whether there is any latest pending value stored during the current buffer time period (e.g., the buffer time period 112-1 of FIG. 8). When there is no such latest pending value, the throttling process 302 proceeds to operation 512, where nothing needs to be done. When there is such latest pending value, the throttling process 302 proceeds to operation 506 again, where the throttler 204 is restarted at the end of the current buffer time period. In the example of FIG. 8, the throttler 204 is restarted at the moment $t_1$, and at the same time, the playback state control command 116-11 is sent to the media streaming platform 106. Then the throttling process 302 enters a second cycle, namely the buffer time period 112-2 in FIG. 8.

It should be noted that in the example of FIG. 5, the throttler 204 and the buffer 206 both have a same buffer time period. Alternatively in other embodiments, the throttler 204 and the buffer 206 may have different buffer time periods. In such case, the client device 104 may still receive unwanted playback state control commands 116 from the media streaming platform 106 even if the throttling process 302 is implemented.

During the buffer time period 112-2, playback state control commands 116-12, 116-13, . . . , 116-19 are set as the latest pending value 802-2 in order at operation 508. At the end of the buffer time period 112-2, the latest pending value 802-2 for the buffer time period 112-2 is stored in the pending command register 205.

At operation 510, it is determined that there is such latest pending value. Thus, the throttling process 302 proceeds to operation 506 again, where the throttler 204 is restarted at the end of the buffer time period 112-2. In the example of FIG. 8, the throttler 204 is restarted at the moment t2, and at the same time the playback state control command 116-19 is sent to the media streaming platform 106. Then the throttling process 302 enters the third cycle. Although not shown in FIG. 8 for simplicity, the throttling process 302 keeps going until eventually there is no subsequent playback state control command generated by the client device 104 during the current buffer time period and the throttling process 302 concludes at operation 512. It should be noted that the throttling process 302 is implemented at the client device 104 in some embodiments.

Referring to FIG. 5, the buffering process 304 in the context of the uplink direction (in the block 592) begins with operation 516, where the buffer is started, triggered, or refreshed (i.e., in the active mode) every time there is one playback state control command 116 being sent to the media streaming platform 106. In other words, the buffer time period is initiated. The buffer 206 remains active for the same period of time as the throttler, namely the buffer time period (e.g., the buffer time period 112-1 of FIG. 8). After waiting for the buffer time period, the buffering process 304 proceeds to operation 518, where the buffer 206 is stopped (i.e., in the inactive mode).

Referring to FIG. 6, the buffering process 304 in the context of the downlink direction (in the block 692) begins with operation 602, where a playback state control command 116 is received by the client device 104. The buffering process 304 then proceeds to operation 604, where it is determined whether the buffer 206 is active. When the buffer 206 is active, the buffering process 304 proceeds to operation 606, where nothing needs to be done. In other words, the client device 104 refrains from processing or ignores the playback state control command 116 received from the media streaming platform 106. When the buffer 206 is not active, the buffering process 304 proceeds to operation 608, where the playback state of the client device 104 is updated according to the playback state control command received from the media streaming platform 106. It should be noted that the buffering process 304 is implemented at the client device 104 in the example of FIG. 3. The buffering process 304 may also be implemented at the media streaming platform 106 in some embodiments, where a buffer at the media streaming platform 106 inhibits the media streaming platform 106 from sending received playback state control commands to the client device 104 and the controlled device 108 during the buffer time period.

Figure 7:
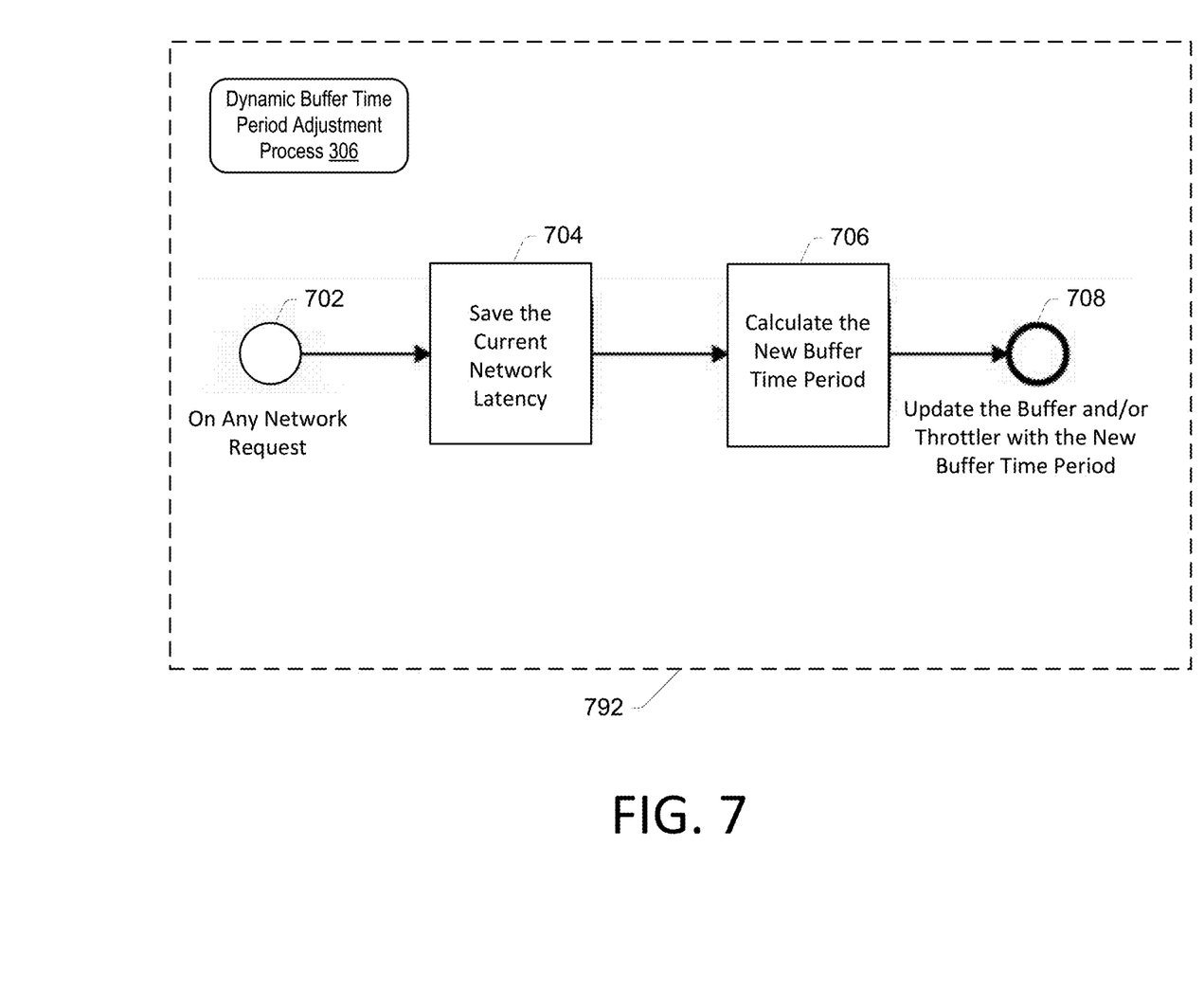
FIG. 7 is a flow chart illustrating an example of the dynamic buffer time period adjustment process in the block.

FIG. 7 is a flow chart illustrating an example of the dynamic buffer time period adjustment process 306 in the block 792. The dynamic buffer time period adjustment process 306 begins with operation 702, where any network request is detected. Then at operation 704, the current network latency is saved. The dynamic buffer time period adjustment process 306 then proceeds to operation 706, where the new buffer time period is calculated based on previously saved network latencies.

In one implementation, the latency between every call made by the client device 104 and its corresponding response received by the client device 104 is stored. The new buffer time period may be chosen as an average latency of the last ten network latencies plus a 20% increase to account for network variations.

In some implementations, the new buffer time period has a minimum value (e.g., 200 milliseconds) such that it will always run for at least 200 milliseconds to address delays in user input. As such, the new buffer time period has a minimum value while may be longer if the average of previous network latencies is large enough.

The dynamic buffer time period adjustment process 306 then proceeds to operation 708, where the throttler 204 and/or the buffer 206, depending on whether they exist, are updated with the new buffer time period. It should be noted that the dynamic buffer time period adjustment process 306 may be implemented at the client device 104 in the example of FIG. 3. In some embodiments, the dynamic buffer time period adjustment process 306 may instead be implemented at the media streaming platform 106. In other embodiments, the dynamic buffer time period adjustment process 306 may also be implemented with the involvement of both the client device 104 and the media streaming platform 106.

Figure 9:
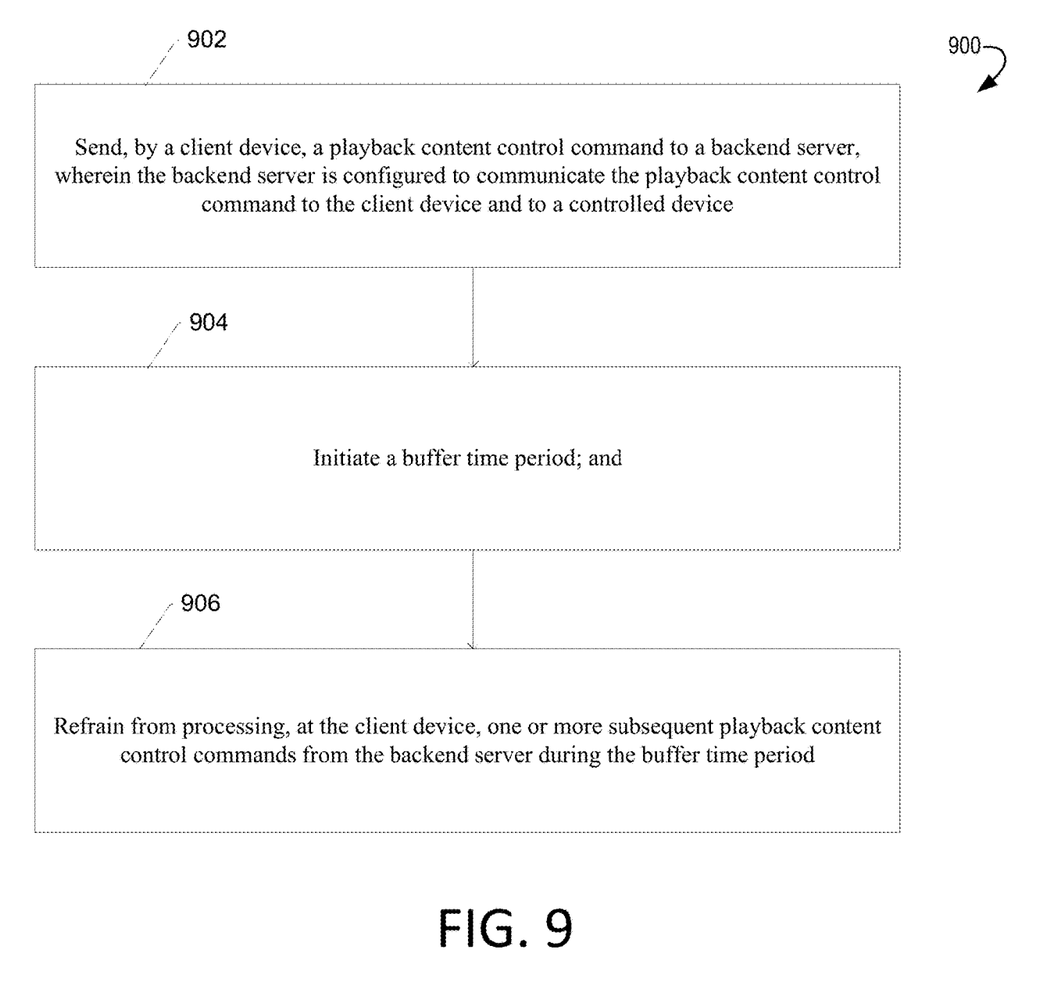
FIG. 9 is a flow chart illustrating an example method of processing playback content control commands.

FIG. 9 is a flow chart illustrating an example method 900 of processing playback content control commands generated at a client device and communicated by a backend server to the client device and a controlled device to control media content playback at the controlled device. At operation 902, a playback content control command is sent to the backend server by the client device. The backend server is configured to communicate the playback content control command to the client device and to the controlled device. At operation 904, a command buffer is triggered to be active for a buffer time period. At operation 906, the client device refrains from processing one or more subsequent playback content control commands from the backend server during the buffer time period.

Figure 10:
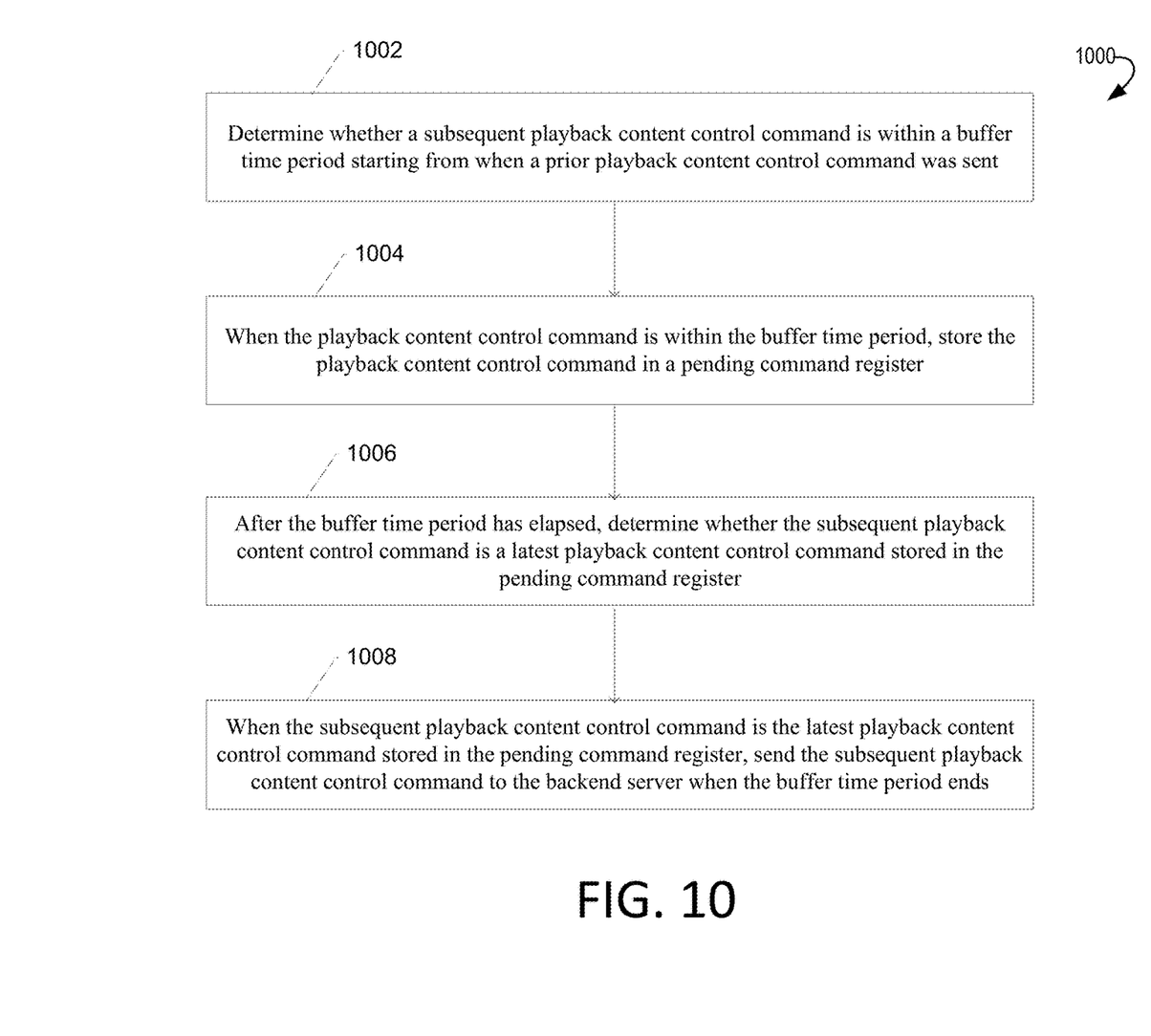
FIG. 10 is a flow chart illustrating another example method of processing playback content control commands.

FIG. 10 is a flow chart illustrating another example method 1000 of processing playback content control commands generated at a client device and communicated by a backend server to the client device and a controlled device to control media content playback at the controlled device. At operation 1002, it is determined that whether a subsequent playback content control command is within a buffer time period starting from when a prior playback content control command was sent. At operation 1004, when the playback content control command is within the buffer time period, the playback content control command is stored in a pending command register. At operation 1006, after the buffer time period has elapsed, it is determined whether the subsequent playback content control command is a latest playback content control command stored in the pending command register. At operation 1008, when the subsequent playback content control command is the latest playback content control command stored in the pending command register, the subsequent playback content control command is sent to the backend server when the buffer time period ends. It should be noted that method 900 and method 1000 may be implemented either independently or jointly. For example, it is possible that method 1000 is implemented in combination with and prior to the method 900, as shown in FIG. 5.

Embodiments of the present disclosure may be conveniently implemented using one or more conventional general purpose or specialized digital computer, computing device, machine, or microprocessor, including one or more processors, memory and/or computer-readable storage media programmed according to the teachings of the present disclosure. Appropriate software coding can readily be prepared by skilled programmers based on the teachings of the present disclosure, as will be apparent to those skilled in the software art.

In some embodiments, the present disclosure includes a computer program product which is a non-transitory storage medium or computer-readable medium (media) having instructions stored thereon/in which can be used to program a computer to perform any of the processes of the present disclosure. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present disclosure has been provided for the purposes of illustration and description. It is not intended to be exhaustive or limited to the precise forms disclosed. Many modifications and variations will be apparent to the practitioner skilled in the art.

The various embodiments described above are provided by way of illustration only and should not be construed to limit the claims attached hereto. Those skilled in the art will readily recognize various modifications and changes that may be made without following the example embodiments and applications illustrated and described herein.

What is claimed is:

1. A method of processing playback content control commands generated at a client device and communicated by a backend server to the client device and a controlled device to control media content playback at the controlled device, the method comprising:
sending, by the client device, a playback content control command to the backend server, wherein the backend server is configured to communicate the playback content control command to the client device and to the controlled device;
initiating a buffer time period, wherein the buffer time period is calculated based at least in part on an average network latency of a network connecting the client device, the backend server, and the controlled device, wherein calculating the buffer time period further comprises:
obtaining a current network latency of the network; and
calculating the buffer time period based at least in part on the current network latency, and previous network latencies of the network; and
refraining from processing, at the client device, one or more subsequent playback content control commands received from the backend server during the buffer time period and discarding the one or more subsequent playback content control commands received from the backend server during the buffer time period to avoid executing the one or more subsequent playback content control commands.

2. The method of claim 1, wherein the initiating the buffer time period comprises:
initiating the buffer time period upon sending the playback content control command to the backend server.

3. The method of claim 2, wherein the initiating the buffer time period comprises:
triggering a command buffer to be active upon sending the playback content control command to the backend server.

4. The method of claim 1, wherein the playback content control command comprises at least one of:
a skip forward command;
a skip backward command;
a play/pause command; and
a scrubbing command.

5. The method of claim 1, wherein the buffer time period is dynamically adjusted.

6. The method of claim 5, wherein the buffer time period has a minimum value.

7. The method of claim 6, wherein the minimum value is 200 milliseconds.

8. A non-transitory computer-readable medium storing instructions that, when executed by a processor of a client device, cause the client device to:
send a playback content control command to a backend server, wherein the backend server is configured to communicate the playback content control command to the client device and to a controlled device;
initiate a buffer time period, wherein the buffer time period is calculated based at least in part on an average network latency of a network connecting the client device, the backend server, and the controlled device, wherein calculating the buffer time period further comprises to:
obtain a current network latency of the network; and
calculate a new buffer time period based on the current network latency and previous network latencies of the network; and
refrain from processing one or more subsequent playback content control commands received from the backend server during the buffer time period and discard the one or more subsequent playback content control commands received from the backend server during the buffer time period to avoid executing the one or more subsequent playback content control commands.

9. The non-transitory computer-readable medium of claim 8, wherein the playback content control command comprises at least one of:
a skip forward command;
a skip backward command;
a play/pause command; and
a scrubbing command.

10. The non-transitory computer-readable medium of claim 8, wherein the instructions further cause the client device to:
send a prior playback content control command to the backend server;
determine whether the playback content control command is within the buffer time period starting from the sending of the prior playback content control command;
when the playback content control command is within the buffer time period, store the playback content control command;
after the buffer time period has elapsed, determine whether the playback content control command is a latest playback content control command stored;
when the playback content control command is the latest playback content control command stored, send the playback content control command to the backend server; and
when the playback content control command is not the latest content control command stored, discard the playback content control command.

11. The non-transitory computer-readable medium of claim 10, wherein the playback content control command is stored in a pending command register.

12. A system for processing playback content control commands, the system comprising:
a client device comprising at least one processor and at least one non-transitory computer-readable medium storing data instructions that, when executed by the at least one processor, cause the client device to:
generate a playback content control command;
send the playback content control command to a backend server;
trigger a command buffer to be active for a buffer time period, wherein the buffer time period is calculated based at least in part on an average network latency of a network connecting the client device, the backend server, and a controlled device, wherein calculating the buffer time period further comprises to:
obtain a current network latency of the network; and
calculate the buffer time period based on the current network latency and previous network latencies of the network; and
refrain from processing one or more subsequent playback content control commands received from the backend server during the buffer time period and discard the one or more subsequent playback content control commands received from the backend server during the buffer time period to avoid executing the one or more subsequent playback content control commands.

13. The system of claim 12, wherein the client device further comprises a command throttler having the buffer time period.

14. The system of claim 12, wherein the data instructions further cause the client device to:
determine whether the playback content control command is within the buffer time period starting from when a prior playback content control command was sent;
when the playback content control command is within the buffer time period, store the playback content control command in a pending command register;
after the buffer time period has elapsed, determine whether the playback content control command is a latest playback content control command stored in the pending command register;
when the playback content control command is the latest playback content control command stored in the pending command register, send the playback content control command to the backend server when the buffer time period ends; and
when the playback content control command is not the latest content control command stored in the pending command register, discard the playback content control command.

15. The system of claim 14, wherein the client device further comprises a buffer time management engine configured to dynamically adjust the buffer time period.

16. The system of claim 12, wherein the system further comprises a controlled device configured to:
receive the playback content control command communicated from the backend server; and
control media content playback at the controlled device according to the playback content control command communicated from the backend server.

17. The system of claim 12, wherein the playback content control command comprises at least one of:
a skip forward command;
a skip backward command;
a play/pause command; and
a scrubbing command.

* * * * *